United States Patent [19]
Burek et al.

[11] Patent Number: 5,434,945
[45] Date of Patent: Jul. 18, 1995

[54] PROTECTIVE SHELL FOR CABLE CONNECTION MODULE

[75] Inventors: Denis E. Burek, Cumming; Monty J. Edwards, Chamblee; Charles McGonigal, Grayson, all of Ga.

[73] Assignee: AT&T Corp, Murray Hill, N.J.

[21] Appl. No.: 267,686

[22] Filed: Jun. 28, 1994

[51] Int. Cl.6 .................................................. G02B 7/00
[52] U.S. Cl. ..................................... 385/135; 385/134; 385/136
[58] Field of Search ........................ 385/135, 134, 136; 174/50.54, 65 R

[56] References Cited

U.S. PATENT DOCUMENTS

| | | | |
|---|---|---|---|
| 4,692,564 | 9/1987 | Campbell et al. | 174/92 |
| 4,754,876 | 7/1988 | Noon et al. | 385/135 X |
| 4,875,952 | 10/1989 | Mullin et al. | 156/48 |
| 5,185,845 | 2/1993 | Jones | 385/135 |
| 5,189,725 | 2/1993 | Bensel, III et al. | 385/135 |
| 5,313,546 | 5/1994 | Toffetti | 385/135 |

FOREIGN PATENT DOCUMENTS

| | | | |
|---|---|---|---|
| 62-49304 | 4/1987 | Japan | 385/136 |
| 622596 | 3/1947 | United Kingdom | 174/65 R |

Primary Examiner—Rodney B. Bovernick
Assistant Examiner—Yisun Song

[57] ABSTRACT

A protective shell for a splice closure or the like has a flange base member and a flange cover member. A triangularly shaped ridge extends along each flange which hold triangularly shaped clamps in place against displacement, yet, in conjunction with the clamps, create room for the insertion of mounting hardware in the clamps. The closure is supported within the shell so that it is surrounded by space for an encapsulant. The supports for the closure are configured to permit passage of liquid encapsulant into the space between the-bottom of the closure and the base member.

11 Claims, 4 Drawing Sheets

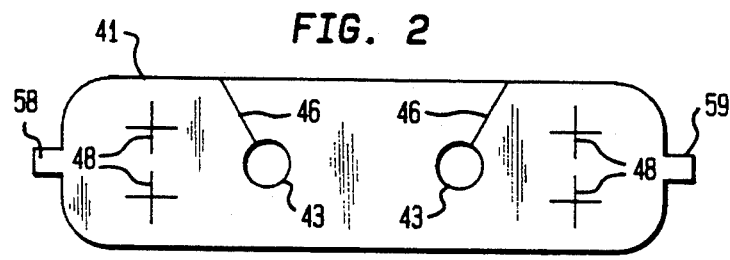
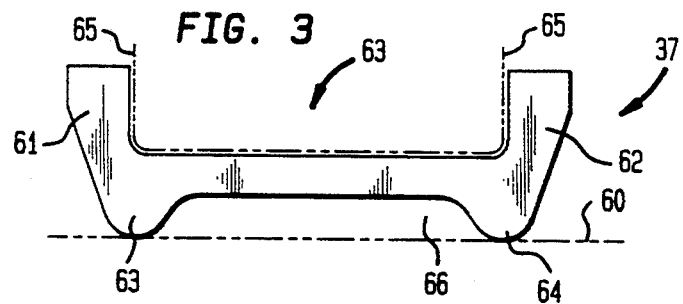
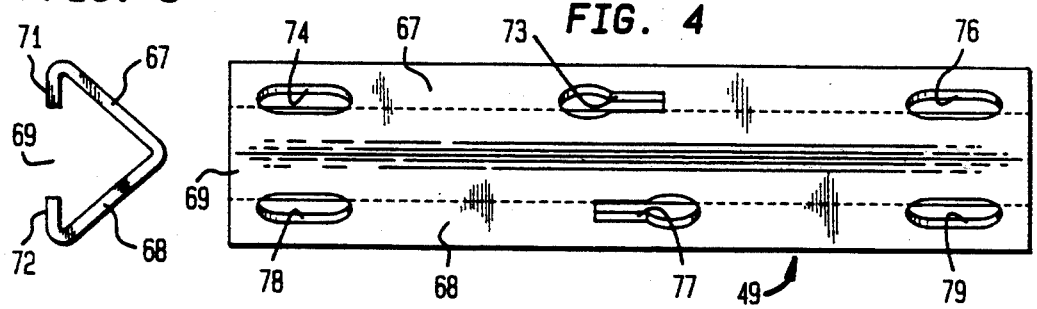
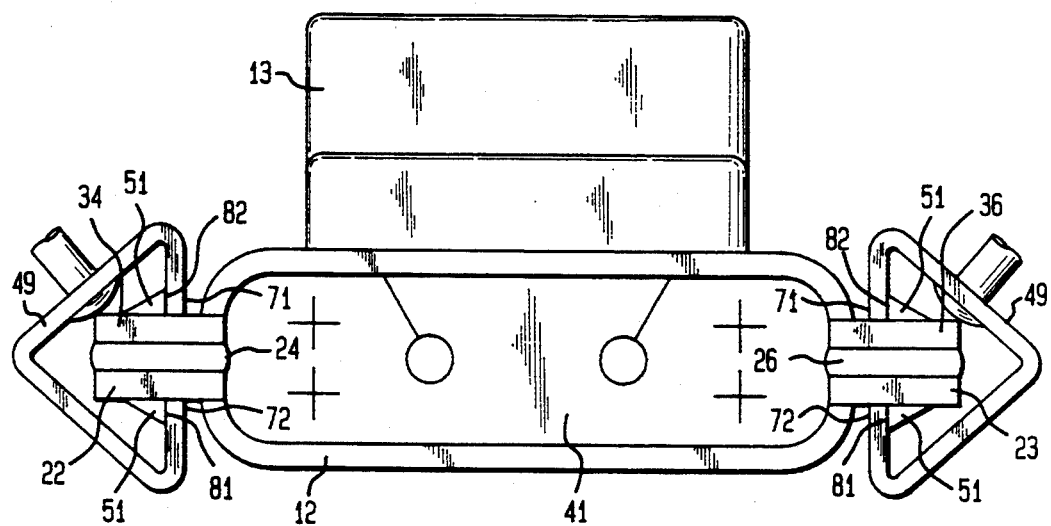

PROTECTIVE SHELL FOR CABLE CONNECTION MODULE

FIELD OF INVENTION

This invention relates to protective covers for use with splice closures and the like, and, more particularly, to a shell that encloses a closure and protects it from moisture, dust and corrosive atmosphere, for example.

BACKGROUND OF THE INVENTION

In a signal transmission system, whether the signal transmission medium be wire or optical fibers, there are, of necessity, interruptions such as splices, for example. In general, in the prior art, such splices are enclosed in a splice closure module for protection, wherein large numbers of splices are housed and, to a large extent, protected from the environment and from other damaging factors, such as from lightning or from various gnawing animals. Where conditions are likely to be extreme, it has been the practice to enclose a splice closure within a protective shell and, often, to fill the empty volume within the shell with encapsulant.

In the area of fiber optics, the splice closure module preferably comprises a metallic body having entrances at each end for the ingress and egress of optical fiber cables to be spliced together. Within the closure, the cables are stripped to the individual fibers for splicing, and the splices are generally organized and protected by means of a splice tray. One such closure is the AT&T UCB1, which, with the proper component parts, anchors and seals the cables, routes the cable fibers to the splice tray, and supports the splice tray itself. Sealant is used around the periphery and in the opening to seal the closure so that the splices are protected from mechanical shock, displacement, or breakage, as well as from moisture and the like. In U.S. patent application Ser. No. 08/263,645, filed Jun. 22, 1994, of Denis E. Burek, Marc D. Jones, Wesley W. Jones and Phillip M. Thomas, the UCB1 closure is shown, along with the several components for achieving the ends discussed heretofore. Another type of splice closure is shown in U.S. Pat. No. 5,185,845 of Wesley W. Jones. In both types of closures, as well as in most other types, it is a necessary feature that the closure be re-entrant. That is, it must be amenable to being entered so that work may be performed on the splices themselves, or so that damaged or malfunctioning parts may be replaced. As a consequence of the need for re-entry, the splice closure itself cannot be filled with an encapsulant which would insure substantially complete protection. It has been the practice, as pointed out in the foregoing, to enclose the splice closure within a shell which can then be filled with a protective material.

In prior art arrangements, the outer protective shell which encloses the splice closure or other type of assembly is filled with an insulating liquid curable encapsulant. The shell must, of course, be substantially leak tight so that the encapsulant, in its liquid phase, does not leak out prior to hardening. The liquid encapsulant is generally poured into the shell and it flows to fill the voids within the shell so as to surround the closure. However, even in its liquid phase the encapsulant is not free flowing because of its high viscosity. As a consequence, air pockets and other voids often remain after the encapsulant hardens, and thus insufficient protection of the closure results. Often such voids occur around the cables entering and leaving the shell and thus water, for example, has almost a clear pathway along the cables themselves directly to the region that is most in need of protection. In U.S. Pat. No. 4,875,952 of Mullin et al., there is shown an encapsulating arrangement that overcomes the problems of the prior art, in which the encapsulant is introduced under pressure into an elastic bladder surrounding the splice tray, and then an additional amount of encapsulant is forced into the surrounding protective shell. Such an arrangement effectively protects the splices or other connectors, but re-entry is made difficult by the splices and wires being embedded in the encapsulant. In U.S. Pat. No. 4,692,564 of Campbell, et al. there is shown an arrangement that is somewhat similar to the arrangement of the Mullin et al. arrangement, but where the encapsulant can be either gravity fed or fed under pressure. The outer cover or shell of the Campbell et al. arrangement comprises two substantially identical members having flanges along their edges and which are fastened together by means of C-clamps.

In use, it is often desirable or where necessary that the entire assembly of cables, closure and protective shell be suspended from an overhead support strand, wire rope or for interior mounting, a support bar. This can be, and most often is, accomplished by the use of straps surrounding the shell and attached to the support stand. Such lashing of the assembly produces the desired suspension, but can be both awkward and time consuming which, in turn, can be costly.

SUMMARY OF THE INVENTION

The present invention, in a preferred embodiment thereof, is intended for use with the AT&T UCB1 or UCB2 splice enclosure, although it is to be understood that the principles and features thereof are applicable for use with other types of closures, both rigid and non-rigid.

The shell of the invention comprises a top or cover portion and a separate bottom or base portion, both having longitudinally extending mating flanges, with the flanges on the bottom portion each having a plastic foam strip extending therealong, which functions as a resilient grommet when the flanges are mated. The ends of both the top and bottom portions are U-shaped to form cable openings when the two are assembled to form the cover. Plastic foam inserts with cable receiving holes are provided at each end through which the cables pass into the splice closure. The inserts are shaped to fill completely the cable openings, and are slit to receive and hold the cables.

First and second closure support members of styrofoam or other suitable material are adapted to be positioned within the shell and to rest on flat surfaces in the bottom portion. Each of support members has a U-shaped top portion adapted to receive the bottom portion of the splice closure, and a U-shaped bottom portion forming first and second legs or feet with a gap therebetween, thereby forming a passageway through which liquid encapsulant can flow. The bottom portion of the shell is contoured to receive the splice closure, thus facilitating centering of the splice closure thereon.

The top portion of the shell is also contoured to conform to the shape of the top portion of the splice closure, and is spaced therefrom. This contouring of both the top and bottom portions of the shell to the general shape of the splice closure makes possible a complete encapsulation of the splice closure while requiring less encapsulant than is needed for a shell such as is shown in the aforementioned Mullin eta. patent.

The upper or exterior surface of each flange on the cover has, extending longitudinally, a wedge or triangularly shaped ridge, with one side of the triangle facing the body of the cover to form a shoulder and sloping downward toward the outer edge of the flange. In like manner, the bottom or exterior surface of each of the flanges on the base has a triangularly shaped ridge oriented the same as the ridges on the flanges of the cover. When the cover and base are assembled together, with the interior surfaces of the flanges in mating relationship, triangularly shaped C-type steel clamps are slid along the flanges, with the lips of the C-clamps bearing against the sides of the triangular wedge shaped ridges that face the body of the cover and of the base and firmly clamping the cover and base together. Each of the triangular C-type clamps thus presents a sloping side in which are formed keyhole-shaped mounting holes for insertion of mounting hardware, and additional slots for lashing the shell to a support member, if desired. In prior art C-clamp arrangements, as shown in the Mullin et al. patent and in U.S. Pat. No. 5,189,725 of Bensel, III, et al., the clamps fit tightly against the flanges, and thus cannot receive any mounting hardware. With the triangularly shaped clamp of the invention, only a portion of the clamp fits firmly against the flanges, thereby creating a space for the insertion of mounting hardware through the keyhole shaped holes.

In the assembly of the shell about the splice closure, the plastic foam inserts are slit from an outer edge to the holes therein, and the holes and slits are coated with a suitable sealant, as are the cables. The cables are then inserted in the foam inserts and the assembled splice closure is placed within the base, resting on the closure support members. The regions of the base, and of the cover, adjacent the openings formed by them are also coated with a sealant, and the cover is placed over the base with their flanges mating. The triangular clamps, two to a side, are then slid into place thereby clamping the base and cover together. The cover is provided with access holes for the introduction of liquid encapsulant which flows throughout the interior of the shell, including the passages formed by the closure support members. The material of the support members which preferably, but not necessarily, is styrofoam, absorbs liquid encapsulant so that the support members actually become part of the encapsulant. Similarly, the plastic foam inserts, which prevent the liquid encapsulant from leaking out of the ends of the shell, absorb some of the encapsulant to form a moisture block to prevent outside moisture from entering the shell. After the encapsulant has set, i.e., hardened, the completed assembly may then be mounted from a bar or cable strand, for example, by means of suitable mounting brackets having headed members which fit within the keyhole shaped openings.

Inasmuch as the encapsulant completely surrounds the splice closure, but does not enter it (the material viscosity of the liquid encapsulant preventing it from entering any small openings), the splice closure can be re-entered by simply removing the shell and the encapsulant which does not disturb the interior of the splice closure.

DESCRIPTION OF THE DRAWINGS

FIG. 2 is an elevation view of a foam insert which holds and locates cables entering the shell;

FIG. 3 is an elevation view of a closure support member as used in the invention;

FIG. 4 is a front elevation view of a triangular clamp as used in the invention;

FIG. 5 is an end view of the clamp of FIG. 4;

FIG. 6 is an end elevation view of the shell of the invention as assembled;

DETAILED DESCRIPTION

Figure 1:
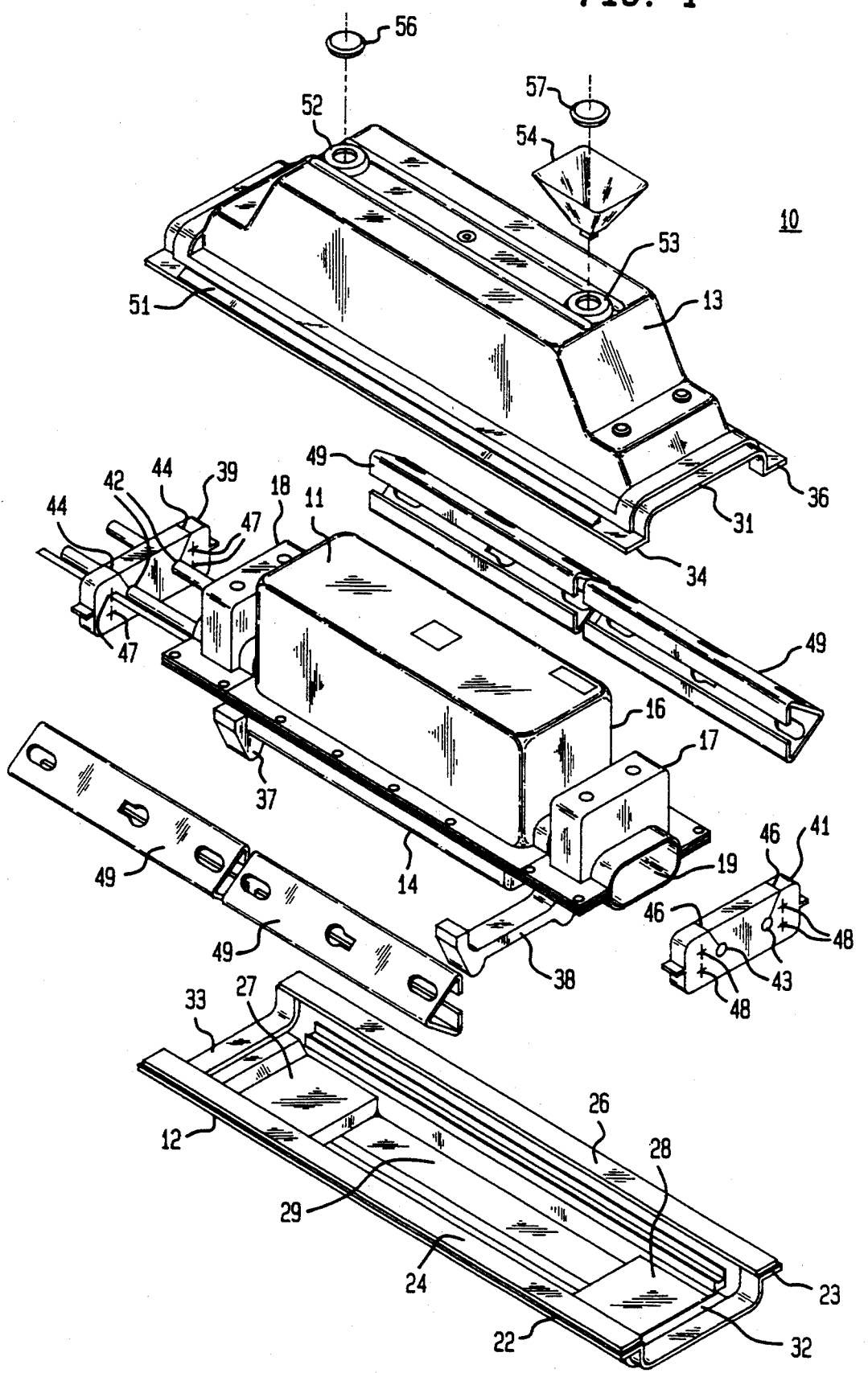
FIG. 1 is an exploded perspective view of the protective shell of the invention and its relationship to the splice closure.

In FIG. 1 there is shown the complete assembly 10 of a splice closure 11 and the base 12 and cover 13 of the protective shell of the invention with its component parts, to be described hereinafter.

Splice closure 11, as shown, is, in this embodiment of the invention, a UCB1 or UCB2 closure as shown and described in detail the aforementioned in U.S. patent application Ser. No. 08/263,645, filed Jun. 22, 1994 in the names of Denis E. Burek, Marc D. Jones, Wesley W. Jones and Phillip M. Thomas. Basically, the closure 11 comprises a base portion 14 and a cover portion 16 and first and second protective clamp members 17 and 18 which, in conjunction with base portion 14, define openings 19 and 21 (only opening 19 being shown) through which the cables entering the closure 11 pass. Clamp members 17 and 18 bear against, and compress, grommets (not shown) which surround the cables, and also cover and protect grip block assemblies (not shown) which anchor the cables in the closure 11.

Figure 7:
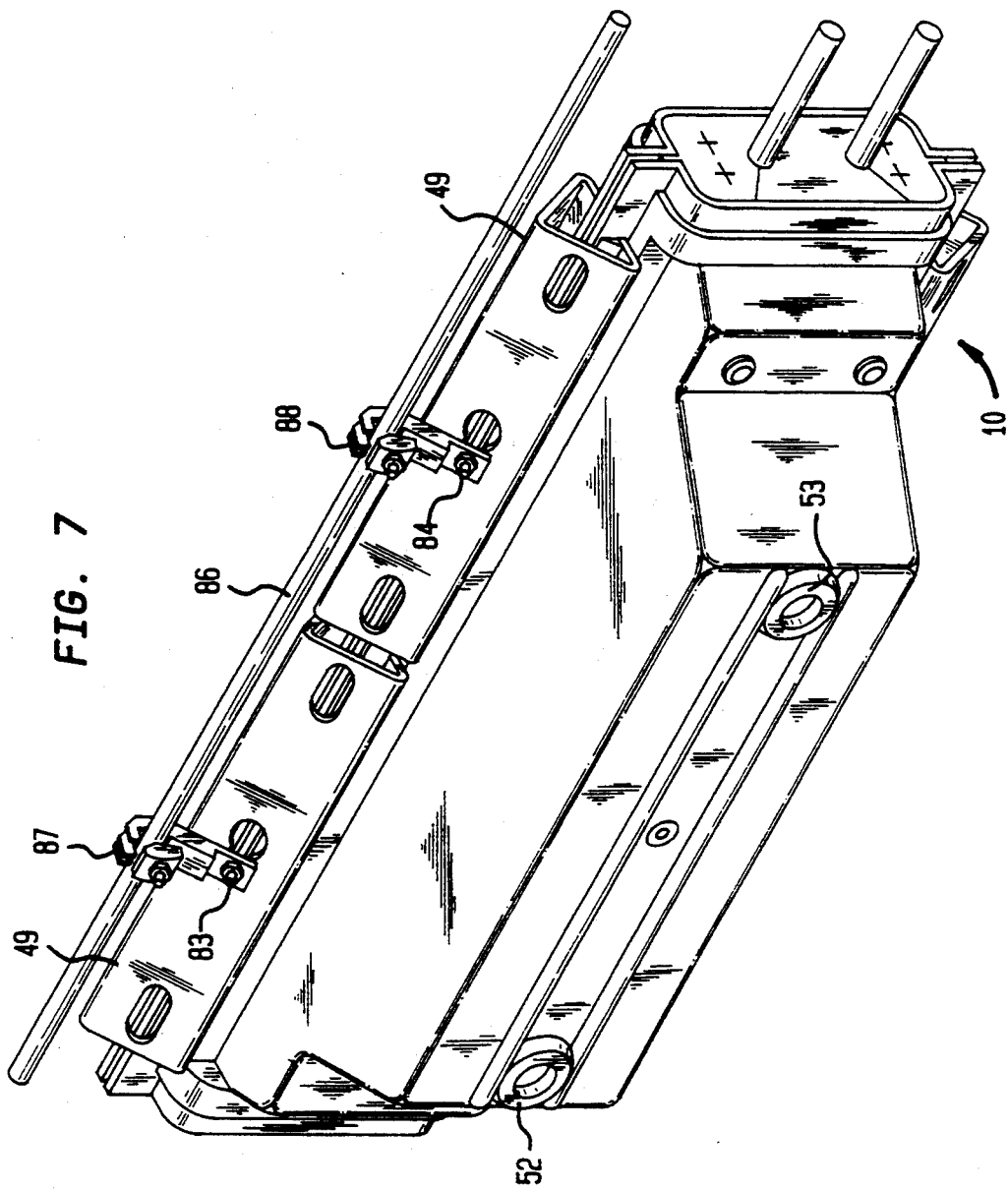
FIG. 7 is a perspective view of the completed splice closure, protective shell assembly in an aerial installation.

Base 12 comprises a U-shaped member having longitudinally extending flanges 22 and 23 on the top or interior surfaces of which are affixed plastic foam strips 24 and 26, respectively, which function as sealing gaskets when the shell is assembled. Base 12 also has formed therein first and second flat surfaces 27 and 28 and a depressed central section 29 for accommodating base portion 14 of closure 11, as will be discussed more fully hereinafter. Cover 13 is, as will be discussed in conjunction with FIG. 7 is contoured to accommodate top or cover portion 16 of closure 11 and, at each end, is substantially U-shaped, with a retaining shoulder 31 at the edge of the U-shaped openings. In like manner, base 12 has shoulder portions 32 and 33 at its extreme ends. Cover 13 also has a pair of longitudinally extending flanges 34 and 36 which, when their interior surfaces are mated with the interior surfaces of flanges 22 and 23 respectively result in the U-shaped ends of both base 12 and cover 13 forming openings for the cables passing through the shell to the closure 11.

Closure 11, more particularly base portion 14 thereof, is supported on base 12 by means of closure support members 37 and 38 which are shaped to receive that portion of base portion 12 directly under the clamp members 17 and 18, and are adapted to rest upon flat surfaces 27 and 28. The support members will be discussed more fully in connection with FIG. 3.

First and second plastic foam insert members 39 and 41 have apertures 42,42 and 43,43 respectively for receiving the cables, as shown. In order that the inserts 39 and 41 may be attached to the cables, slits 44,44 and 46,46 leading from an outer edge of inserts 39 and 41 to the apertures 42 and 43 are provided. Usually, such slits will be cut into the inserts 39 and 41 in the field during the assembly and installation process. Both inserts 39 and 41 also have slits 47,47 and 48,48, formed therein for receiving grounding straps, where necessary, as shown. During the assembly process, apertures 42,42 and 43,43, slits 44,44 and 46,46, and slits 47,47 and 48,48, where necessary, are filled with a suitable sealing gel, as are the cables and ground strips, in the region thereof where the inserts 39 and 41 surround them.

Figure 8:
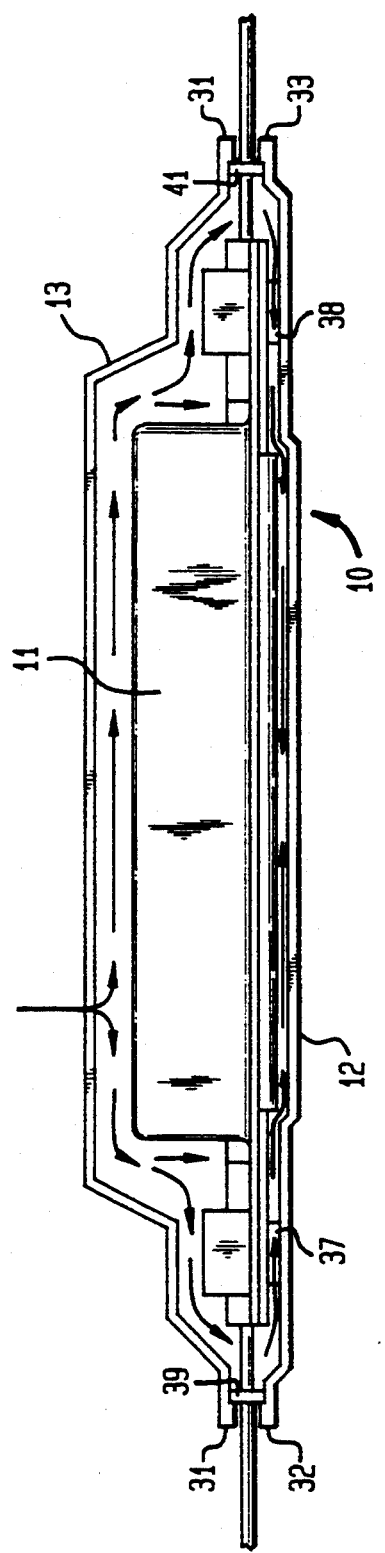
FIG. 8 is a cross-sectional side elevation view of the shell of the invention with the splice closure contained therein.

After inserts 39 and 41 have been positioned on the cables, and the closure 11 placed on base 12, supported by supports 37 and 38, cover 13 is lowered onto base 12, with the interior surfaces of flanges 34 and 36 mating with the interior surfaces of flanges 22 and 23, and with insert members bearing against the shoulders 31 and 32, as best seen in FIG. 8, the base 12 and cover 13 are clamped together by means of a plurality of clamping members 49,49. The top surface of each of flanges 34 and 36, and the bottom surfaces of each of flanges 22 and 23 is provided with a longitudinally extending wedge shaped ridge 51, only one of which is visible in FIG. 1, for enabling each of the clamping members 49,49 to grip firmly both base 12 and cover 13 without the possibility of lateral slippage or displacement. The arrangement of clamping members 49,49 and ridges 51,51 will be fully discussed in conjunction with FIGS. 4, 5 and 6. After the assembly 10 has been completed, liquid encapsulant is introduced into the interior of the shell through one or more holes 52,53 by any suitable means, such as a funnel 54. As will be discussed more fully hereinafter, the liquid encapsulant flows freely throughout the interior of the shell, substantially completely filling it. After the encapsulant has set, funnel 54 is removed and holes 52 and 53 are plugged by plugs 56 and 57 respectively.

In FIG. 2 there is shown the plastic foam insert 41, which is identical to insert 39, and which has holes or apertures 43,43 for receiving the cables, and slits 46,46 for affording cable access to the holes 43,43. As pointed out heretofore, slits 46,46 may be cut by the installer in the field, or they may be formed during the manufacture of the insert. Insert 41 also has slits 48,48 therein for receiving ground straps or wires, where necessary. Insert 41 is shaped to conform to the openings formed by the base 12 and cover 13 and is slightly larger than such opening so that it rests against the interior surface of shoulder 32 (or shoulder 33, as the case may be). Insert 41 has first and second projecting tabs 58 and 59 which are adapted to fit between the mating flanges 22,34 and 23,36 respectively. Thus, when base 12 and cover 13 are clamped together, insert 41 is firmly held against both lateral and longitudinal displacement by the flanges and the shoulders. The material of insert 41 is such that it absorbs some of the encapsulant, thereby forming a moisture impervious seal for interior of the shell of the invention.

FIG. 3 is an elevation view of the closure support member 37 which is identical to support member 38, both of which rest upon flat surfaces 27 and 28 respectively of the base 12 as indicated by the dashed line 60, and which hold and support the base portion 14 of the closure member 11, as indicated by the dashed lines 65. Member 37, which is preferably made of an encapsulant absorbing material such as styrofoam is substantially U-shaped in cross-section, having first and second upstanding legs 61 and 62 defining a central area 63 in which base portion 14 of closure 11 rests. The lower portion of member 37 is recessed, as shown, to define first and second feet 63 and 64 with a passageway 66 extending therebetween. As pointed out hereinbefore, passageway 66 permits free flow of liquid encapsulant under the bottom portion of base portion 14 of the enclosure after the assembly 10 is completed.

FIGS. 4 and 5 are an elevation view of the triangular clamping member 49 and an end view thereof, respectively. Each clamping member is preferably of stainless steel or other material having a degree of elasticity or resiliency. As can be seen in FIG. 5, the cross-sectional form of member 49 is that of a C-clamp modified to have a triangular shape having first and second sides 67 and 68 with a clamping opening 69 formed by base legs 71 and 72. Because of the spring action of the material of member 49, opening 69 may be increased in size with a consequent increase in pressure of 71 and 72 toward the opening. As can be seen in FIG. 4, side 67 has a keyhole shaped opening 73 located approximately midway between the ends of clamp member 49, and spaced slots 74 and 76 aligned therewith. In like manner, side 68 has a keyhole shaped opening 77 approximately opposite opening 73, but oriented in the opposite direction, as shown, and spaced slots 78 and 79 aligned therewith. The opposite orientation of keyholes 33 and 77 allows either end of clamp 49 to be inserted over the mating flanges 22, 34 and 23, 36.

FIG. 6 is an end elevation view of the assembled shell of the invention, with the insert 41 in place, but for clarity, not depicting the cables and ground straps. As was disclosed hereinbefore, each of the flanges 22, 23, 34 and 36 has a longitudinally extending wedge or triangularly shaped ridge 51 formed thereon. As can be seen in FIG. 6, one side of the triangular wedge shape 51 on each of flanges 22 and 23 faces the body of base 12 thereby forming a shoulder, and the wedge tapers down toward the outer edge of the flange. In like manner, one side 82 of the triangular wedge shape on each of flanges 34 and 36 faces the body of the cover 13 forming a shoulder and the wedge tapers down toward the outer edge of the flange. The opening 69 in each of the clamps 49 has a width slightly less than the combined width of the mating flanges and the uncompressed foam strips 24 and 26 so that when clamps 49, which have a degree of elasticity, are slid into place along flanges 22, 34 and 23, 36, strips 24 and 26 are tightly compressed, and the inside surfaces of legs 71 and 72 bear against sides or shoulders 81 and 82 of the ridges 51,51, thereby tightly clamping base 12 and cover 13 together. In addition, the unique configuration of the clamps 49,49 and the ridges 51,51 prevent clamps 49,49 from being laterally pulled off of the flanges. As can be seen in FIG. 6, there is room between the inner surfaces of legs 67 and 68 and the flanges to permit insertion of headed mounting members 83 and 84 in the keyholes 73 and 77. As can be seen in FIG. 7, which depicts the completed assembly 10 in an aerial mounting, hanging from strand 86, the clamps 49,49 provide easy access for the mounting bolts 83 and 84 and, in turn, hanger clamps 87 and 88. The time necessary to hang the assembly 10 is thus greatly reduced and the process greatly simplified. The weight of the assembly 10 is borne by the top clamp members 49,49 which cannot be dislodged due to the legs of the clamps bearing against the sides of the wedge shaped ridges.

In FIG. 8 the assembly 10 is shown in cross-section so as to depict the relationship of closure 11 to base 12 and cover 13 in the assembly 10, as well as depicting the flow paths of the liquid encapsulant. As can be seen in FIG. 8, closure 11, supported by supports 37 and 38, does not touch the inner surfaces of the shell of the invention, so that it may be completely surrounded by the encapsulant. In addition, with foam inserts 39 and 41 bearing against the inner surfaces of shoulders 31, 32, and 33, as shown, liquid encapsulant is prevented from leaking out during the encapsulation process. As can also be seen in FIG. 8, base 12 and cover 13 are contoured to conform roughly to the shape of closure 11. With the base 12 and cover 13 thus shaped, the amount of encapsulant necessary has been reduced by a factor of three over prior art requirements, from approximately ten thousand (10,000) grams of encapsulant to approximately thirty-two hundred (3,200) grams.

The foregoing has been a discussion of the numerous unique features of the present invention in a preferred embodiment thereof. These features, as well as the principles of the present invention, are readily adaptable to other types of closures, for example, without departure from the spirit and scope of the invention.

We claim:

1. a protective shell for housing a cable transmission system module, said shell comprising:

a base member and a cover member, said base member having longitudinally extending first flanges and said cover member having longitudinally extending second flanges adapted to mate with said first flanges;

said base member and said cover member defining a cable entrance opening at each end of said shell;

support means for supporting the module within said shell, said support means having a substantially U-shaped configuration for embracing and holding the module in spaced relationship to said base member and said cover member such that as an encapsulate is introduced into said shell, the encapsulant can flow substantially completely about the module to enclose the module within said shell;

clamping means for clamping said base member and said cover member together, said clamping means comprising a longitudinally extending wedge shaped ridge on each of said first and second flanges and clamping members adapted to bear against said first and second flanges to press them together, said clamping members each having an interior configuration wherein portions of the interior surfaces of said clamping members are spaced from said first and second flanges and are oriented to permit insertion of mounting members in said clamping member without interfering with said first and second flanges.

2. A protective shell as claimed in claim 1 wherein each of said cable entrance openings has shoulders having interior surfaces formed about at least a portion of the periphery thereof.

3. A protective shell as claimed in claim 2 and further comprising insert members for receiving the cables adapted to be inserted in said cable entrance openings, said insert members being adapted to bear against the interior surfaces of said shoulders.

4. A protective shell as claimed in claim 3 wherein said insert members are of plastic foam material.

5. A protective shell as claimed in claim 1 wherein each of said support members has a means defining a passage for the flow of a liquid encapsulant therethrough.

6. A protective shell as claimed in claim 1 wherein each of said support members is made of an encapsulant absorbing material.

7. A protective shell as claimed in claim 6 wherein said material is styrofoam.

8. A protective shell as claimed in claim 1 wherein each of said clamping members is an elongated body having a hollow triangular shaped cross-section with one side of the triangle having first and second legs with spaced ends forming a longitudinal opening extending the length of said elongated body.

9. A protective shell as claimed in claim 8 wherein each of said clamping members is made of stainless steel.

10. A protective shell as claimed in claim 1 wherein each of said wedge-shaped ridges forms a shoulder facing the shell and tapers down toward the outer edge of the flange.

11. A protective shell as claimed in claim 10 wherein each of said clamping members has a longitudinal opening formed by first and second legs, said first and second legs being adapted to bear against the shoulder of said wedge shaped ridge upon which it is mounted.

* * * * *